May 22, 1962 G. FRANCIA 3,035,869
DECELERATION AND CENTRIFUGAL RESPONSIVE BRAKE SYSTEM
Original Filed Nov. 19, 1956 2 Sheets-Sheet 1
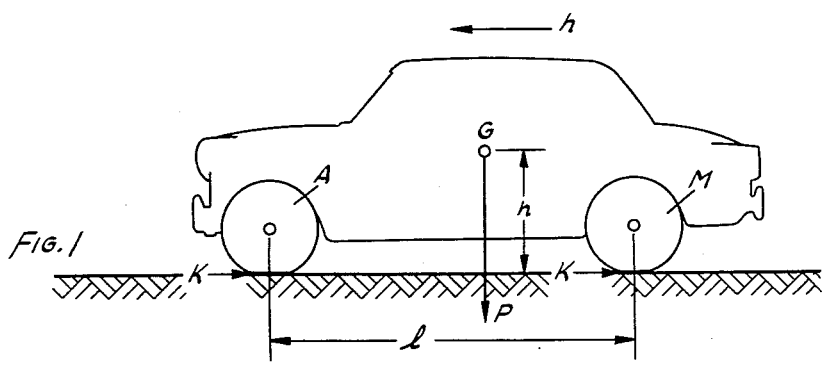
FIG. 1
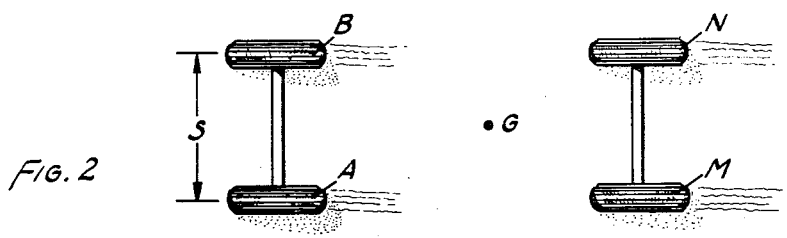
FIG. 2
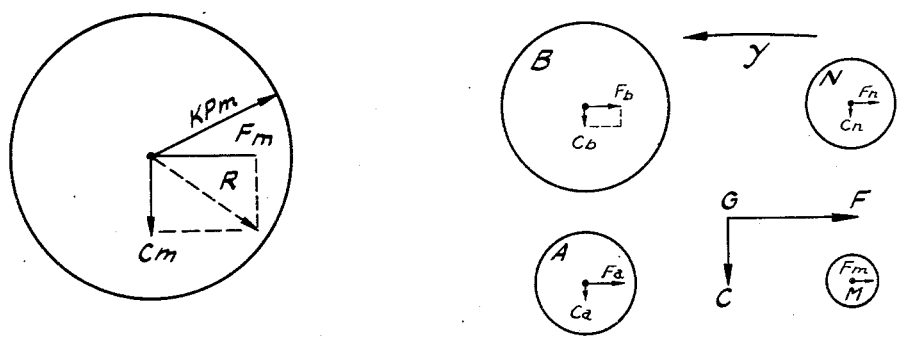
FIG. 3
FIG. 4
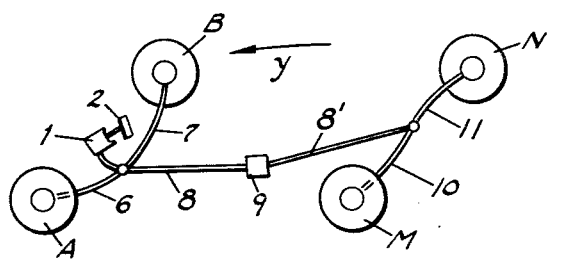
FIG. 5
INVENTOR.
GIOVANNI FRANCIA
BY
Dale A. Winnie
ATTORNEY May 22, 1962 G. FRANCIA 3,035,869
DECELERATION AND CENTRIFUGAL RESPONSIVE BRAKE SYSTEM
Original Filed Nov. 19, 1956 2 Sheets-Sheet 2
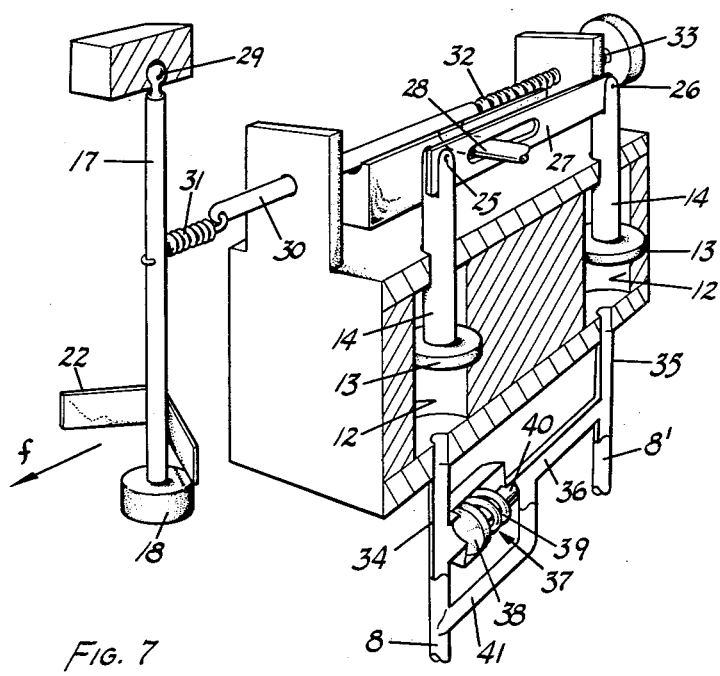
FIG. 7
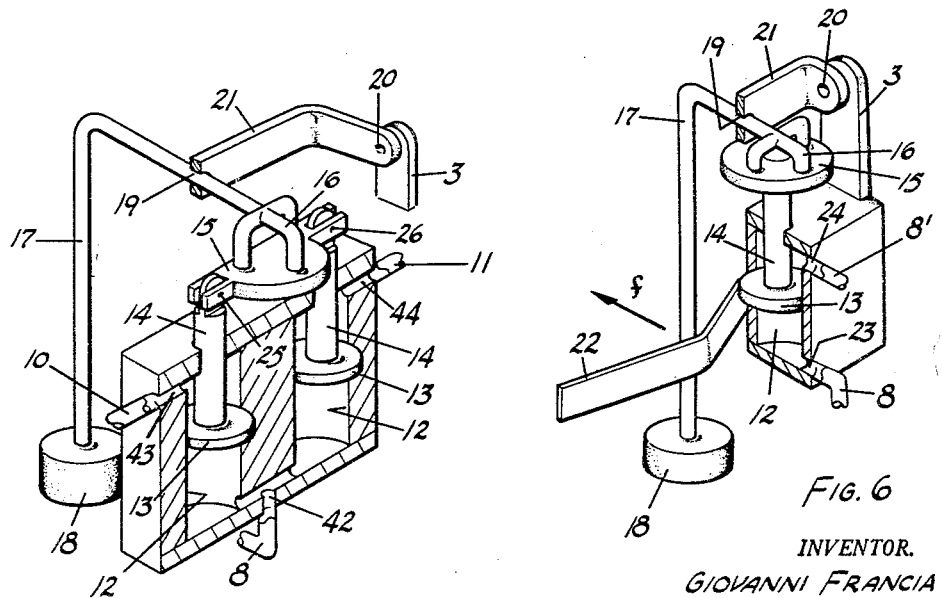
FIG. 8
FIG. 6
INVENTOR.
GIOVANNI FRANCIA
BY
Dale A. Winnie
ATTORNEY

United States Patent Office 3,035,869
Patented May 22, 1962

3,035,869
DECELERATION AND CENTRIFUGAL RESPONSIVE BRAKE SYSTEM
Giovanni Francia, Via Vassalo 11/17, Genova, Italy
Continuation of abandoned application Ser. No. 623,188, Nov. 19, 1956. This application Feb. 1, 1960, Ser. No. 11,400
21 Claims. (Cl. 303—6)

This invention relates to vehicle braking devices in general, and more particularly to a vehicle braking system for stopping a vehicle that is traveling at high speeds without causing the vehicle to skid out of control.

Automotive vehicles are known to have a tendency to skid forward and sidewards out of control if the vehicle brakes are effectively applied and held during high speed travel. Generally, the rear wheels of a vehicle lose traction first and the back end of the vehicle begins to skid out of control. Braking on a turn or curve may cause a further exaggerated condition that can result in the vehicle turning over.

Simple analysis indicates that a different braking effort is best applied to the different wheels of a vehicle for most effective braking. For example, when a vehicle is being decelerated there is a greater load on the front wheels than on the rear wheels due to the moment of inertia about the vehicle's center of gravity. Accordingly, the front wheels may be braked harder than the rear wheels before loss of traction and skidding will occur. Similarly, on turning a curve the outermost wheels bear a greater load than the inner wheels, due to centrifugal force effects, and can likewise be braked harder before loss of traction and skidding will occur.

A further observation is that the application of a braking effort beyond that which will cause deceleration without skidding is, in most instances, useless and in fact dangerous.

It is an object of this invention to disclose and teach a method and means of vehicle brake control which will prevent vehicle skidding and loss of control.

It is also an object of this invention to disclose and teach a rational vehicle braking method which is self-applying under conditions which require its use.

Another object of this invention is to disclose and teach a vehicle brake control system which does not disrupt the normal operation of vehicle brakes except in conditions which require its use.

A further object of this invention is to disclose a vehicle braking system which is responsive to deceleration of a vehicle and will compensate therefor.

A still further object of this invention is to disclose a simplified means of rational control of vehicle braking systems.

In further discussion it will be shown that this invention may be broadly characterized by a free hanging or otherwise supported mass which is responsive to the inertial and centrifugal effects to which a vehicle is subjected when the vehicle brakes are applied. Such means is operatively connected to brake controlling or actuating means to apportion the available braking effort to different of the vehicle wheel brakes as required by the prevailing and changing braking conditions.

In the drawings:

FIGURE 1 is a diagrammatic view of an automotive vehicle.

FIGURE 2 is a diagrammatic representation of the wheels of the vehicle of FIGURE 1.

FIGURE 3 is a graphic or vector representation of the friction circle of wheel M.

FIGURE 4 is a graphic and vector representation of the friction circles of all four wheels of the vehicle of FIGURE 1 with deceleration and turning on a curve.

FIGURE 5 is a diagrammatic view of the fluid braking system of the vehicle of FIGURE 1.

FIGURE 6 is a perspective and cut-away view of a simple brake control device operating in accord with the teachings of this invention.

FIGURE 7 is a perspective and cut-away view of another brake control device.

FIGURE 8 is a perspective and cut-away view of still another form of brake control device including the teachings of this invention.

Before describing a working embodiment of this invention, the basic theory and its application should be understood. My parent application S.N. 623,188, now abandoned, of which this is a continuation, discusses the theory and sets forth the mathematical solutions in much more detail. However, for present purposes only a very brief discussion of the theory will be given.

FIGURES 1 and 2 show a basic four wheeled vehicle having the vehicle weight P depicted as depending from its center of gravity G, at a height $h$ above the road surface, and equally divided between the four wheels A, B, M and N. K signifies the coefficient of friction between the vehicle tires and the road surface. These factors while varying with different vehicles, as will the wheel base $l$, the tracking width $s$, the suspension stiffness, etc., but are readily computed for any given vehicle and are therefore constant factors in the evaluation which follows.

A braking force greater than the coefficient of friction times the load on a particular vehicle wheel is necessary to cause it to skid while rolling in a forward direction. Since the load on the different wheels varies during braking, due to inertial and centrifugal effects causing a forward and outward shift of the static load, the different wheels are receptive of different braking efforts without loss of traction and skidding.

FIGURE 3 is the friction circle for the wheel M. The friction circle radius is equivalent to the coefficient of friction K times the load $P_m$ on wheel M. Of the available braking effort F, only such braking effort $F_m$ as does not extend outside the friction circle will be effective in decelerating the wheel without causing loss of traction and skidding. Another factor to be considered is the centrifugal force incident to braking a vehicle while in a turn or on a curve. Each vehicle wheel must resist this centrifugal force by a centripetal force which also remains within the friction circle or side skidding will result. The centripetal force $C_m$ on wheel M, and the resultant R of the braking effort $F_m$ and centripetal force $C_m$, must both be within the friction circle.

FIGURE 4 shows the friction circles for the four vehicle wheels A, B, M and N when braked at a given vehicle speed and while executing a curve represented by the arrow y. The load distribution is such that a greater braking effort may be applied to the forward wheels A and B as compared to the rear wheels M and N (due to inertial effects) and a greater braking effort may be applied to the outer wheels B and N as compared to the inner wheels A and M (due to centrifugal force effects).

Of the available braking effort F and of the centripetal force C, to resist centrifugal effects, an apportionment must be made to each wheel within the limits of the friction circles if skidding is to be avoided at each wheel. Further, the torque moment of the braking forces $F_a$, $F_b$, etc. at the different wheels must balance the centripetal forces $C_a$, $C_b$, etc. at each wheel if the vehicle is to be kept from turning about its center of gravity G.

As the vehicle decelerates and comes out of a turn or curve the braking effort and centripetal force at the different wheels must change since the redistribution of the static load P on the wheels will vary their friction circles; which dictates their safe non-skid limits.

The means hereinafter disclosed, in simplified form, is such as is responsive to the inertial and centrifugal effects incident to braking a vehicle as well as to the deceleration of the vehicle, and consequent changes in the initial factors, to enable adequate compensation therefor. As will be shown, it is also such as is readily made controllable of the vehicle braking system for apportionment of the available braking effort as best suits the varying conditions.

For further detailed discussion of the theory and its application, reference should be made to the aforementioned application S.N. 623,188, now abandoned, of which this is a continuation.

FIGURE 5 diagrammatically represents a hydraulic brake control system for the vehicle of FIGURE 1. The pump 1 is actuated by a brake pedal 2 to transmit hydraulic pressure directly to the brake shoes of the front wheels A and B through conduits or ducts 6 and 7. The same hydraulic pressure passes through conduit 8 to a control device 9 and to the brake shoes of the rear wheels M and N through the conduits or ducts 10 and 11.

The correction device 9 is able to reduce the braking pressure which actuates the brake shoes of the rear wheels M and N without modifying that which acts on the front wheels A and B. The pressure on the front wheel brake shoes is that of pump 1, while the pressure on the back wheel brake shoes is such as is reduced or differentiated within the correcting device 9.

Referring to FIGURE 6, which shows the device generically designated by 9 in FIGURE 5, there will be seen at 12 a cylindrical chamber, at 13 a piston which, with the rod 14, supports in opposition to the said piston a plate 15. A crossed-arm member 16 acts on the plate through three feet, while an arm 17 connected to the crossed-arm member 16 is extended downwards and comprises a mass 18 in the form of a pendulum. The point of support 19 of the arm 17 is supported by a transverse member 21 mounted by means of the pin 20 on the uprights 3 while permitting the arm 17 to carry out oscillations in the two planes, in a direction normal to the plane of the drawing and in the same plane as the latter respectively. 22 is a guide member displaceable in the direction of the arrow f to limit the commencement of the action of the device. 23 is an inlet port for the fluid under pressure, coming from the pump 1 (FIGURE 5) and 24 is a port communicating with the brakes of the rear wheels M and N (FIGURE 5): The arrow f indicates the direction of the movement.

With the aforesaid device, at the instant of the braking on a straight path, the mass 18 is moved when the braking reaches a certain value, in the direction of the movement in the plane in which the arm 17 is situated. The crossed-arm member 16 turns about the pins 20 of the transverse member 21 and pushes the plate 15 and consequently the piston 13 downwards, the said piston being pushed by the hydraulic pressure acting on the lower face and determined by the pump 1 (FIGURE 5). This opposition, the commencement of which is adjusted by the member 22, is such that, while the real pressure due to the pump 1 acts directly on the brake shoes of the front wheels A and B, there acts on the brake shoes of the rear wheels M and N a reduced pressure which is a function of the movement of the mass 18, that is to say of the speed reduction produced by the braking.

In the case of braking along a non-rectilinear path, which must be regarded as the form of braking which most frequently occurs, the mass 18 is displaced in the direction of the movement, along a plane between that in which the arm 17 is situated and the plane normal thereto, with an inclination towards the outside of the bend. The crossed-arm member 16 in turning under the action of inertia about the pins 20 and of the centrifugal force about the point of support 19, will act as before on the plate 15, either through the foot opposite the arm 17 supporting the mass 18, or through that which is disposed towards the inside of the bend. The two combined actions determine, as in the preceding case, an action on the piston 13 which is partly or completely in opposition to the action exerted on the said piston by the pressure of the fluid delivered by the pump 1. The action on the brake shoes of the rear wheels M and N will thus be reduced as a function of the speed reduction due to the braking or to the degree of the curve.

Referring to FIGURE 7, in which the same references have been used for the various parts as far as possible, there is at 12 a pair of cylinders comprising pistons 13 provided with rods 14, the upper ends of which turn about the pins 25 and 26 disposed at the ends of a lever 27, which is provided with a movable point of support 28. The arm 17 supporting the mass 18 is supported at its upper end by a spherical pivot 29 permitting oscillations in all directions. 30 is a rod supporting the movable point of support 28 and connected by means of the inextensible cable 31 to the arm 17, and by a spring 32 to the screwthreaded adjustment rod 33. 34 is a duct communicating with the pump 1 and with the brake shoes of the front wheels A and B, and 35 is a duct communicating with the brake shoes of the rear wheels M and N (FIGURE 5). 36 is a connection between the ducts 34 and 35, in which connection there is provided an intercepting member 37 consisting of a piston 38 loaded by a spring 39 and provided with an obturating rod 40. The duct 41 is a device which partially by-passes the intercepting member 37.

The operation of the device illustrated in FIGURE 7 is similar to that of the device illustrated in FIGURE 6, with the addition of adjusting and intercepting means constituted by the presence of the movable point of support 28, the position of which is a function of the adjustment which can be made by means of the screw 33 and of the displacement of the pendulum (arm 17 and mass 18). When the said displacement increases (as a function of the speed reduction and of the centripetal acceleration), the point of support 28 moves towards the pin 25 and consequently reduces the ratio between the arms of the lever 27 and thus the ratio of the pressures acting on the brake shoes of the pair of front wheels A and B and on the pair of rear wheels M and N respectively (FIGURE 5). The presence of the connecting duct 36, which eliminates through the by-pass 41 the intervention of the device for correcting the pressure ratio, until the pressure due to the braking reaches a predetermined value beyond which the intercepting member 37 becomes operative, and, under the action of the pressure acting on the piston 38, overcomes the action of the spring 39, and the rod 40 intercepts the duct 41.

Referring to FIGURE 8 and taking into account the parts illustrated in the preceding figures, it will be seen that the port 42 places the pump 1 and the brakes of the front wheels A and B (FIGURE 5) in communication with the two lower members of the cylinders 12, while the ports 43 and 44 place in communication respectively, one of the upper chambers with the brake of the left-hand rear wheel M and the other with the right-hand rear wheel M. The rods 14 are rotatably mounted on the pins 25 and 26 supported by the lever 15.

The operation is similar to that of the preceding constructions, with the modification that the reduced pressure acting on the brakes of each of the rear wheels M and N (FIGURE 5) is different in the case of braking on the bends, the pressure which acts on the brake of the rear wheel outside the bend being higher and vice versa. This difference is due to hte action exerted in opposite directions by the ends of the lever plate 15 on the pistons 13 by reason of the rotation of the arm 17 about 19. The wheel on the inside of the bend or curve corresponds to the piston which tends to descend, and a lower pressure will act on the brake shoes of the said wheel.

It will be appreciated that the variations and modifications shown by the drawings and described by the disclosure are interchangeable and that no limitation is necessarily intended thereby. For example, the limit stop or response inhibitor 22 may be used interchangeably with the means inclusive of bypass passage 36 and responsive to a certain brake fluid pressure before the deceleration and centrifugal force sensitive controls are effective. Likewise, while the description has defined means for controlling the rear wheel vehicle brakes, it is obvious that similar controls could be used to control the front wheel vehicle brakes with or separate from such means or the like used to control the rear brakes. Further, the four wheel combination recited is not intended as being restricted to having all four wheels on the same vehicle; as for example, a tractor-trailer arrangement might make use of the rear wheels of the tractor unit as the front wheels of the trailer, etc.

All modifications and improvements which make use of the principles taught by this invention are to be considered as included within the hereinafter appended claims unless such claims by their language expressly state otherwise.

I claim:

1. A method of braking a vehicle which comprises, decelerating the vehicle by application of a uniform pressure to the vehicle front and rear brakes, during the application of said pressure modifying the effective pressure applied to the vehicle rear brakes in proportion to the deceleration of the vehicle and in proportion to centrifugal force acting on the vehicle without decreasing the effective pressure applied to the front brakes.

2. A method of braking a vehicle which comprises, decelerating the vehicle by application of a uniform pressure to the vehicle front and rear brakes, during the application of said pressure sensing the deceleration of the vehicle and simultaneously sensing centrifugal force to which the vehicle is subject, reducing the effective pressure applied to the vehicle rear brakes in proportion to the instantaneous value of the resultant of the deceleration and centrifugal forces without decreasing the effective pressure applied to the front brakes.

3. A method of braking a vehicle which comprises, applying a uniform braking pressure to the vehicle front and rear brakes to decelerate the vehicle, during the application of said pressure sensing the deceleration of the vehicle and simultaneously sensing any centrifugal force to which the vehicle is subjected, during the sensing of said deceleration and centrifugal forces developing a resultant force having an instantaneous value proportionately corresponding to the instantaneous value of the resultant of the deceleration and centrifugal forces, during the application of said braking pressure reducing the effective pressure applied to the vehicle rear brakes in proportion to the instantaneous value of said resultant of the deceleration and centrifugal forces without decreasing the effective braking pressure applied to the front brakes, and varying the effective pressure at the rear brakes individually in correspondence with the direction of said resultant thereby to brake the rear brakes individually in dependence upon which rear wheel of the vehicle is subjected to a greater value of centrifugal force during deceleration and a change of direction of the vehicle.

4. A method of vehicle braking, comprising; applying a uniform pressure to front and rear vehicle brakes and thereafter reducing the effective pressure on said rear brakes in accordance with and proportionate to the deceleration and centrifugal forces acting on said vehicle during such vehicle braking.

5. A method of vehicle braking, comprising the steps of; applying a uniform braking effort to front and rear vehicle brakes for decelerating said vehicle, sensing the responsive deceleration of said vehicle, simultaneously sensing the centrifugal forces to which said vehicle is subject; reducing the effective pressure to the rear vehicle brakes in proportion and response to the instantaneous value of the resultant of said deceleration and centrifugal forces.

6. A method of braking a vehicle which comprises; applying a uniform braking pressure to the vehicle front and rear brakes to decelerate the vehicle, during the application of said pressure sensing the deceleration of the vehicle and simultaneously sensing any centrifugal force to which the vehicle is subjected during the sensing of said deceleration and centrifugal forces developing a resultant force having an instantaneous value proportionately corresponding to the instantaneous value of the resultant of the deceleration and centrifugal forces, during the application of said braking pressure reducing the effective pressure applied to the vehicle rear brakes in proportion to the instantaneous value of said resultant of the deceleration and centrifugal forces without decreasing the effective braking pressure applied to the front brakes, and varying the effective pressure at the rear brakes individually in correspondence with the direction of said resultant thereby to brake the rear brakes individually in dependence upon which rear wheel of the vehicle is subjected to a greater value of centrifugal force during deceleration and a change of direction of the vehicle.

7. A brake control device, comprising; fluid pressure regulating means operatively connectable within a fluid pressure braking system, means operatively engaged to said fluid pressure regulating means and responsive to the vectoral sum of the deceleration and centrifugal forces incident to use of said fluid pressure braking system for corresponding and proportionate control of said regulating means, and regulation inhibiting means disposed within said fluid pressure braking system and responsive to a predetermined fluid pressure for inactivation thereof.

8. A brake control device, comprising; fluid pressure regulating means operatively connectable within a fluid pressure braking system, means operatively engaged to said fluid pressure regulating means and responsive to the vectoral sum of the deceleration and centrifugal forces incident to use of said fluid pressure braking system for corresponding and proportionate control of said regulating means, and regulation inhibiting means disposed for engagement by said responsively disposed means for inactivation thereof precedent conditions requiring regulation of said fluid pressure regulating means.

9. In a vehicle braking system having front and rear wheel brakes interconnected together and receptive of a uniform braking pressure, means operatively disposed and interconnected within said system and responsive to the combination of deceleration and centrifugal forces acting on a vehicle during braking for corresponding control of braking pressure to said rear wheel brakes singularly and together in accordance therewith.

10. In a braking apparatus for a vehicle having front and rear brakes, in combination, means operatively interconnected to said brakes for actuating said brakes with uniform pressure, and means operatively interconnected to said actuating means and automatically operative and responsive to vehicle deceleration and centrifugal forces acting upon said vehicle for corresponding and proportionate reduction of the effective pressure applied by said actuating means to said rear brakes without decreasing the pressure applied by said actuating means to said front brakes.

11. In the braking apparatus according to claim 10; said automatically operative and responsive means including means interconnected within the actuating means between the rear wheels of a vehicle and responsive to the centrifugal force to which said vehicle is subject during braking for apportioning the available braking effort to said rear wheels accordingly.

12. In a braking apparatus for braking a vehicle having front and rear brakes, in combination, means for applying a uniform fluid pressure to the brakes, means operatively connected to said last mentioned means for automatically and continuously sensing the deceleration of the vehicle during the application of the brakes and simultaneously sensing the centrifugal force to which the vehicle is subject for causing a different and lower fluid pressure to be applied to the rear brakes than the fluid pressure applied by said first mentioned means and without decreasing the fluid pressure effective on the front brakes as the first mentioned means is operated.

13. In a braking apparatus according to claim 12, in which the fluid pressure applying means comprises a hydraulic brake system having means for generating the uniform pressure and in which the means for causing the application of a pressure on the rear brakes which is lower than the pressure applied to the front brakes comprises, means defining at least one cylinder, a piston operable in said cylinder, a pendulum operably connected to said piston, means for mounting the pendulum so that is responds instantaneously to the vehicle deceleration and the centrifugal force acting thereon and for operably connecting the piston and pendulum so that said piston is displaced in response to the deceleration and centrifugal force to vary the effective hydraulic pressure applied to the rear brakes, means providing fluid communication between the cylinder and the pressure generating means, and means providing fluid communication between the cylinder and the rear brakes individually, whereby displacement of said piston will vary the effective fluid pressure applied to the rear brakes.

14. In a braking apparatus for braking a vehicle having front and rear brakes, in combination, means for applying substantially uniform braking pressure to the front and rear brakes, means operatively connected to said last mentioned means and constantly responsive to the deceleration of the vehicle during the application of said braking pressure and simultaneously responsive to the centrifugal force acting on the vehicle during the application of said braking pressure, means operatively connected to and rendered effective by said responsive means during the application of the braking pressure to reduce the effective pressure applied to the rear brakes individually in proportion to the instantaneous value of the resultant of the deceleration and centrifugal forces without decreasing the effective pressure applied to the front brakes.

15. Fluid pressure regulating means for vehicle brake control and other uses, and comprising; a fluid filled chamber having one end connected to a fluid pressure initiating source and the other end connected to a fluid pressure utilizing source, a piston head disposed within said chamber and between the ends thereof, and an extraneous force detective means simultaneously responsive to centrifugal and intertial forces incident to the operation of a vehicle and productive of a singular resultant force, said last mentioned means being operatively connected to said piston head for regulation thereof by said resultant force and consequent modification of the fluid pressure otherwise transmittable through said fluid filled chamber.

16. Fluid pressure regulating means for vehicle brake control and other uses, and comprising; a pair of fluid filled chambers each having one end connected to a fluid pressure initiating source and the other end connected to a separate fluid pressure utilizing source, piston head members disposed within each of said chambers between the ends thereof and cooperatively engaged together outside of said chambers, and an extraneous force detective means simultaneously responsive to centrifugal and inertial forces incident to the operation of a vehicle and productive of a singular resultant force, said last mentioned means being operatively connected to said piston heads for regulation thereof by said resultant force and consequent modification of the fluid pressure otherwise transmittable through said fluid filled chamber.

17. Fluid pressure regulating means for vehicle brake control and other uses, and comprising; a pair of fluid filled chambers each having one end connected to a fluid pressure initiating source and the other end connected to a separate fluid pressure utilizing source, piston head members disposed within each of said fluid filled chambers and having means of cooperative engagement provided therebetween outside of said chambers, a variable fulcrum engaged with said means of cooperative engagement between said piston head members, and an extraneous force detective and responsive means operatively engaged to said fulcrum for variable positioning thereof and accordingly proportionate regulation of said piston head members within their respective fluid filled chambers and a corresponding regulation of the fluid pressure transmittible therethrough.

18. In a braking apparatus for braking a vehicle having front and rear brakes, in combination, means for applying a uniform fluid pressure to the brakes, means for automatically continuously sensing the deceleration of the vehicle during the application of the brakes and simultaneously sensing the centrifugal force to which the vehicle is subject for causing a different and lower fluid pressure to be applied to the rear brakes than the fluid pressure applied by said first mentioned means and without decreasing the fluid pressure effective on the front brakes at the first mentioned means is operated, the fluid pressure applying means comprises a hydraulic brake system having means for generating the uniform pressure and in which the means for causing the application of a pressure on the rear brakes which is lower than the pressure applied to the front brakes comprises, means defining at least one cylinder, a piston operable in said cylinder, a pendulum operably connected to said piston, means for mounting the pendulum so that it responds instantaneously to the vehicle deceleration and the centrifugal force acting thereon and for operably connecting the piston and pendulum so that said piston is displaced in response to the deceleration and centrifugal force to vary the effective hydraulic pressure applied to the rear brakes, means providing fluid communication between the cylinder and the pressure generating means, and means providing fluid communication between the cylinder and the rear brakes individualy, whereby displacement of said piston will vary the effective fluid pressure applied to the rear brakes.

19. A method of vehicle braking, comprising; applying a braking pressure to front and rear vehicle brakes, modifying the effective pressure to one of said front and rear vehicle brakes, and subsequently further modifying the effective pressure on said rear brakes in accordance with and proportionate to the deceleration and centrifugal forces acting on said vehicle during such vehicle braking.

20. A method of braking a vehicle which comprises: decelerating the vehicle by application of a braking pressure to the vehicle front and rear brakes, during the application of said uniform pressure modifying the effective pressure applied to one of said vehicle front and rear brakes, and subsequently reducing the effective pressure applied to the vehicle rear brakes in proportion to centrifugal forces acting on the vehicle without corresponding modification of the effective pressure applied to the front brakes.

21. In a vehicle braking system having front and rear wheel brakes interconnected together and receptive of a uniform braking pressure, means operatively disposed and interconnected within said system and responsive to the combination of deceleration and centrifugal forces acting on a vehicle during braking, said means including a relatively free hanging mass operatively interconnected within said system for control of braking pressure to said rear wheel brakes singularly and in unison.

References Cited in the file of this patent

UNITED STATES PATENTS

| | | |
|---|---|---|
| 2,152,123 | Williams | Mar. 28, 1939 |
| 2,868,338 | Lucien et al. | Jan. 13, 1959 |

UNITED STATES PATENT OFFICE
CERTIFICATE OF CORRECTION

Patent No. 3,035,869                                    May 22, 1962

Giovanni Francia

It is hereby certified that error appears in the above numbered patent requiring correction and that the said Letters Patent should read as corrected below.

Column 4, line 61, for "M", second occurrence, read -- N --; line 71, for "hte" read -- the --; column 5, line 7, for "ctrtain" read -- certain --; column 8, line 54, for "uniform" read -- braking --.

Signed and sealed this 11th day of December 1962.

(SEAL)
Attest:

ERNEST W. SWIDER
Attesting Officer

DAVID L. LADD
Commissioner of Patents